Oct. 20, 1931.  L. B. JONES  1,828,704
APPARATUS FOR THE MANUFACTURE OF GAS FROM OIL
Filed March 21, 1927
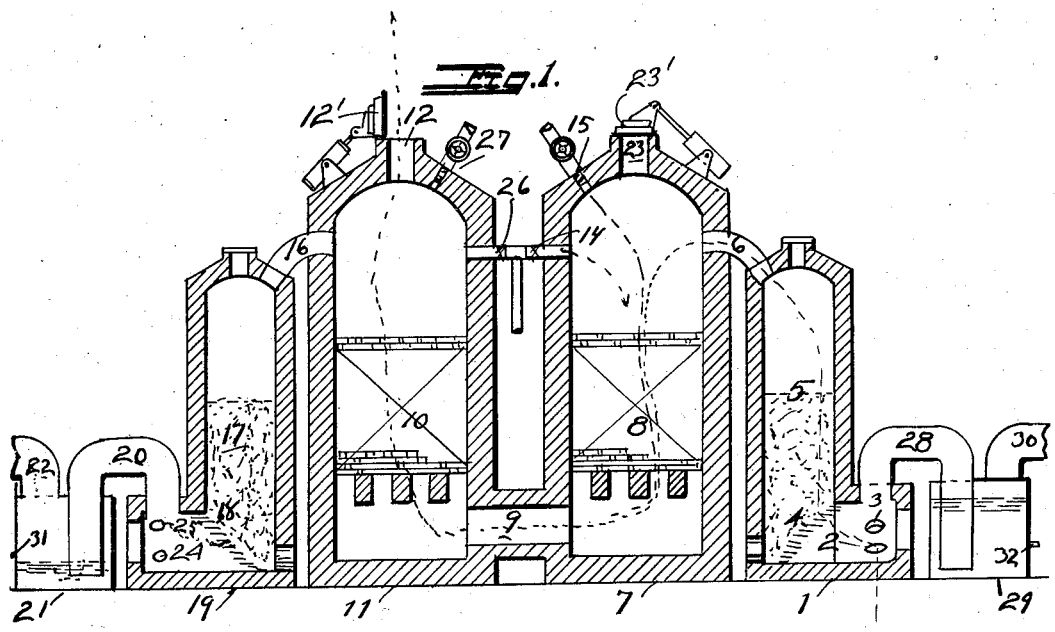
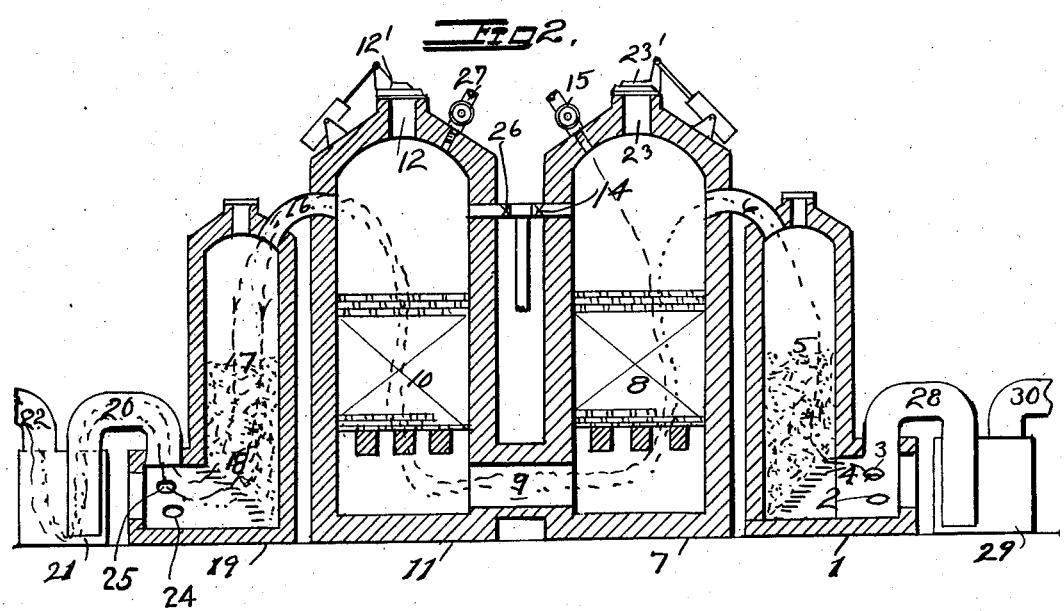
INVENTOR.
Leon B. Jones.
BY Carlos P. Griffin
ATTORNEY.

Patented Oct. 20, 1931

1,828,704

UNITED STATES PATENT OFFICE

LEON B. JONES, OF SAN FRANCISCO, CALIFORNIA, ASSIGNOR TO JONES GAS PROCESS CORPORATION, A CORPORATION OF CALIFORNIA

APPARATUS FOR THE MANUFACTURE OF GAS FROM OIL

Application filed March 21, 1927. Serial No. 176,957.

Oil has been extensively used for the manufacture of gas for many years, but in present processes there is also produced large quantities of residual carbonaceous material, commonly termed lamp-black.

Lamp-black is separated from the gas by washing and scrubbing, and after separation from the wash water and subsequent drying is commonly used as boiler fuel for steam generation. In some plants it is also used in standard apparatus as the solid fuel for making carburetted water gas. Either use, however, is uneconomical and wasteful as the fixed charges on equipment and the additional labor necessary to separate, dry and handle this material reduces its net value to almost nothing. In fact in most plants a large part of this lamp-black is today being thrown on the dump as useless. The use of by-product lampblack as boiler fuel or as water gas generator fuel is recognized as a necessary means of disposal, and not as an economical saving.

The principal object of the present invention is to provide economical and commercially satisfactory process of manufacturing gas by the thermal dissociation of oil or other liquid hydrocarbon, suitable for domestic and industrial use, without the production of an excess of the carbonaceous by-product lampblack.

The invention relates to the production of "oil gas" as the term may be used to designate gas made from oil dissociation as served by utility companies for domestic and industrial use, and to distinguish it from so-called "producer gas" made by partial combustion of a solid or liquid fuel.

In changing a hydrocarbon from a liquid to a gaseous state there is an unavoidable excess of carbon remaining uncombined, and in the present methods or processes more or less steam is introduced which by dissociation combines with a part of this excess carbon to form water gas.

The re-forming of hydrocarbons by heat to produce a desirable commercial gas requires a time and temperature of subjection inadequate to the simultaneous dissociation of steam in sufficient quantities to combine with an appreciable amount of the said carbonaceous deposit. Developments in manufacturing methods to the present have been largely directed to creating through superheat or catalysis, a more nearly ideal cracking atmosphere minimizing the uncombined carbon liberation and stimulating a more active steam dissociation and carbon combination.

These improvements have been successful in reducing the amount of lamp black as a by-product from oil gas manufacture, but have never approached complete elimination. In some earlier and cruder processes as much as 35 to 40 lbs. of lamp black was produced per thousand cubic feet of gas. With later and more scientific methods the by-product lamp-black has been reduced as low as 15 lbs. per thousand cubic feet of gas. In quite recent years efforts to further reduce the lamp-black production along these lines has been hampered and partly counteracted by the difference in the character of the oil now available for gas manufacture. The "cracking" processes now extensively employed by practically all the oil refineries results in a fuel oil less efficient for gas manufacture with existing methods and most plants are now using more oil and making more lampblack by-product per unit of gas produced than had been the case a few years ago.

Lampblack, or the carbonaceous residual from oil gas manufacture, is highly combustible and capable when in an incandescent state of being combined with steam to produce water gas. One object of the present invention is to utilize this material for gas making purposes in a single operation avoiding the waste incident to removal and handling and economizing in the use of oil, and to continue the operation cyclically. Other objects of the invention will be apparent as the description proceeds.

Generally speaking the process of the present invention consists of alternately heating checker work or other refractory material by the combustion of oil gas deposited carbon in a fuel bed and intermittently passing steam through the fuel bed to cool the deposited carbonaceous material and forming a proportion of water gas, subjecting oil or other liquid hydrocarbon to the heat of refractory material and separating the resultant gas from residual carbonaceous material by filtering through said precooled bed of deposited material.

Another object of the invention is to conserve a part of the sensible heat and other losses of present methods. As the filter bed in the separator has been cooled below the dissociation point of oil gas by the admission of steam before it is used to filter the oil gas this body of material functions to absorb and retain a considerable part of the sensible heat of the oil gas, now dissipated and lost in washing and cooling apparatus.

Another object of the present invention is to so arrange the apparatus that the process may be carried out with the maximum gas production in the shortest possible time.

An embodiment of an apparatus for carrying out the invention is shown on the accompanying drawings in which the same reference numeral is applied to the same portion throughout the invention, but I am aware that there may be modifications thereof.

Figure 1 is a central vertical section of one type of apparatus in which this method of gas making may be carried out, showing one step of the process in action, and, Figure 2 is a similar view showing an apparatus for a second step of the process.

The process is cyclical and consists of two heating periods and two gas making periods, each heating and making period being consecutive and each complete cycle being in alternately reverse directions. In the making period both water gas and oil gas are made, but in the depicted apparatus these steps are carried out simultaneously by the alternately reversible feature, conserving much time in a commercial operation.

Referring to the example illustrated in the drawings, the apparatus consists of two gas separators 1 and 19, preferably metal shells lined with fire brick or other refractory material and fitted with grates 4 and 18 to support the deposited carbonaceous material. The separator shells are connected respectively at their upper extremities by connections 6 and 16 to gas generator shells 7 and 11. The generator shells, preferably metal containers lined with fire brick, are connected to each other at their lower extremities by connection 9 and each is provided with open arches to support checker brick or other heat-storing refractory material.

Each generator is provided at its upper extremity with stack openings 12 and 23 which may be closed by stack covers 12' and 23'. The separators are connected respectively by pipes 20 and 28 to valveless hydraulic seals 21 and 29 and thence by pipes 22 and 30 to scrubbers or holders (not shown) for storage or use of the gas produced.

Primary air is introduced below the grates at connections 2 and 24 and steam at 3 and 25 by suitably valved connections. Secondary air to aid combustion is introduced at 14 and 26 into the gas generator chambers above the checker work and oil for gas making is introduced at 15 and 27 by suitably valved connections to a source of supply.

The apparatus having been initially placed in operation by placing and igniting some carbonaceous material on the grates 4 and 18 in shells 1 and 19, the operation of the process proceeds as follows on the apparatus illustrated.

Primary air is introduced at 2 with or without steam introduced at 3 into the base of the separator 1 and passing through grates 4 combustion takes place in the bed of carbonaceous material 5, the products of combustion together with any combustible gas passing through connection 6 to the chamber above the checker work in generator shell 7. Secondary air is admitted at 14 to complete combustion of any combustible gas and the hot products of combustion pass down through the checker work 8 through the connection 9 upwardly through checker work 10 and find egress to the atmosphere through stack opening 12.

In practice it is found that by the admission of primary air without steam to the base of the separator, combustion is supported and producer gas is formed to heat the checker work, but by the admission of steam with the primary air, and the production of some blue water gas with the producer gas both of which are burned with secondary air above the checker-work, the maximum amount of latent heat is transferred from the fuel bed to the checker work with the minimum of sensible heat to increase the fuel bed temperature.

When sufficient heat has been stored by this operation in checker work 8 and 10, primary and secondary air are discontinued at 2 and 14, stack cover 12' is closed and steam alone is introduced at 3 to the base of the separator 1 passing through grate 4 and through the now highly-heated combustible material 5, part of the steam is dissociated to form water gas, passing through connection 6 where oil is simultaneously introduced at 15, the oil vapors together with the water gas passing down through checker work 8 in oil gas generator 7, through connection 9, and up through checker work 10 wherein a fixed and stable gas is produced and passing with any residual carbonaceous material in suspension in the gas through connection 16 into the top of shell 19. The gas passes through the carbonaceous material 17 depositing thereon particles of carbon entrained in the mixed gases, the gas passing through the bed of material and grates 18, connection 20, hydraulic seal 21, and connection 22 to the point of storage or use. The passage of the gas through the carbonaceous material 17 just mentioned above follows the cooling of the fuel bed by a previous water cycle operation in order to prevent the dissociation of the gas by too high a temperature.

When this portion of the cycle has continued until the stored heat in the checker work is reduced below the economic or desirable gas making temperature this portion of the cycle is discontinued and after purging the apparatus of the remaining gas, stack opening 23 is opened in the top of generator 7, primary air is admitted at 24 with or without steam at 25 into the base of separator 19 and passing through grates 18, creates combustion in the deposited bed of carbonaceous material 17.

Passing through connection 16 the products of combustion, together with any combustible gas meet secondary air through 26, which completes the combustion of combustible gases and the hot products of combustion pass down through checker work 10, through connection 9 and up through checker work 8 and to the atmosphere through stack opening 23 in the top of generator 7.

When the checker work has again been properly heated, air is discontinued at 24 and 26, stack opening 23 is closed and steam is introduced at 25 into the base of separator 19. Water gas formed by passage through the now highly heated carbonaceous material 17 passes into the top chamber of oil gas generator 11 through connection 16. Oil is simultaneously introduced at 27, and the oil gas and water gas pass together through the checker work 10 and connection 9 up through checker work 8, through connection 6, the gas passing down through the now cooled carbonaceous material 5, depositing thereon any solid particles of carbon from the oil dissociation, thence through grates 4, connections 28 and seal 29 and connection 30 to the point of storage or use. The water in seal 32 will be lowered at this time.

This cycle is concluded when the checker work temperature has dropped below an economical point and the first described cycle is then repeated and thereafter these two cycles alternately and intermittently follow each other reversely through the apparatus.

It is to be understood that during the making cycle when steam is introduced below the grates in the separators and passes up through the incandescent carbonaceous material, the amount of dissociation to produce water gas is incidental only to the proper cooling of the bed of carbonaceous material for its subsequent use as a filter at a temperature low enough to prevent decomposition of the oil gas. While the steam may not all be decomposed and combined with carbon to form water gas, part of the steam through insufficient contact time may be only partially saturated with carbon to form carbon dioxide and part of the steam may pass through the carbonaceous material uncombined and pass in a highly superheated state to the top chamber of the oil gas generator thus providing a highly desirable atmosphere in which to dissociate the liquid hydrocarbon, i. e. to prevent any undue production of lampblack.

It is also evident that as part of the deposited carbonaceous material is consumed through combustion to heat the checker work and part of the deposited material is combined with steam to form water gas, that these two uses may be so exactly adjusted to the amount of deposited residue, as to maintain an equilibrium in which a proper depth of material is always maintained in the separators to properly filter the oil gas without depletion or excess. 31 and 32 are valved connections by which the relative depth of water in the hydraulic seals can be intermittently altered when the cycle of operation is reversed, and hot valves are in this way avoided.

It is to be understood that oil or other liquid hydrocarbon is ordinarily sprayed into an apparatus with steam and it is not intended to preclude the passage of a proportion of steam along with oil from the scope of the claims.

The operation of this apparatus is as follows: Assuming the apparatus to be started for the first time a quantity of coke in a state of more or less fine subdivision may be placed in chambers 5 and 17 to such depth as the operator may deem advisable. This coke is then set afire and allowed to burn for a period of time long enough to get it all up to about a low red heat, whereupon the usual cycle of operation may be started, and examining Figure 1 it will be seen that the water in seal 29 is then maintained at a sufficient depth to prevent any air from escaping through the pipe 30.

The air is supplied at the bottom of the carbon bed 5 and blown therethrough and through the connecting pipe 6 into the adjacent checker work. Since there is inevitably made some producer gas as the result of the air passing through the bed 5, secondary air is passed into the checker work receptacle at 14 to burn any combustible gas passing through the checker brick. This gas will then pass down through the checker brick 8, through the pasage 9, and up through the checker brick 10 and out of the receptacle at 12′. When the checker brick has been sufficiently heated, as will be determined by a person skilled in the operation of the process, the valve 12′ will be closed, the air will be shut off below the bed 5, and steam will be blown into that bed. This will result in carrying out the cycle as illustrated in Figure 2. Blue water gas will be the result of passing the steam through the bed 5, and this blue water gas will pass through the apparatus as indicated by the dotted line, Figure 2. The secondary air at 14 will also have been discontinued and at the same time the oil will be sprayed into the checker brick receptacle at 15, whereupon the heat from the checker brick will dissociate the oil and it will pass along with the hot blue water gas to the next adjoining checker brick receptacle and from there it will pass through the connection 16 and then down through the carbon bed 17. Since the carbon bed 17 is at this time comparatively cool the solid carbonaceous material formed as a result of the oil gas making process, will collect thereon. The mixed oil and water gas is then passed on through the pipe 20, water seal 21 in which the water is now maintained at a low level, and pipe 22 to the scrubbers and storage holders. When the checker brick has become cooled the operation is reversed by opening the valve 23¹ and proceeding the same, as is illustrated in Figure 1 from the left instead of from the right until the checker brick has been sufficiently reheated, whereupon the operation indicated in Figure 2 is carried on from the left to a sufficient cooling of the checker brick, whereupon the cycle is again repeated from the right as indicated in Figures 1 and 2 of the drawings.

Having thus described my invention, what I desire to secure by Letters Patent of the United States is as follows, but modifications may be made in carrying out the invention as shown in the drawings and in the above particularly described form thereof, within the purview of the annexed claims.

1. An oil gas making apparatus comprising: a pair of oil gas generating chambers directly interconnected at their lower ends; a separate fuel bed chamber connected to the upper end of each of said generating chambers; means for heating said generating chambers from said fuel beds; means for introducing a liquid hydrocarbon into said generating chambers to form an oil gas; and means for causing said oil gas to flow downwardly through one of said fuel beds.

2. An oil gas making apparatus comprising a pair of oil gas generating chambers directly interconnected at their lower ends; a separate fuel bed chamber connected to the upper end of each of said generating chambers; means for heating said generating chambers alternately from said fuel beds; means for introducing a liquid hydrocarbon into said generating chambers to form an oil gas; and means for causing said oil gas to alternately flow downwardly through each of said fuel beds.

3. An oil gas making apparatus comprising a pair of oil gas generating chambers directly interconnected at their lower ends; a separate fuel bed chamber connected to the upper end of each of said generating chambers to supply heat thereto; means for introducing a liquid hydrocarbon into said generating chambers to form oil gas and lampblack; and means for filtering the lamp-black from the oil gas by causing said oil gas with the lamp-black entrained therein to pass downwardly through one of said fuel beds.

4. An oil gas making apparatus comprising a pair of oil gas generating chambers directly interconnected at their lower ends; a separate fuel bed chamber connected to the upper end of each of said generating chambers to supply heat thereto; means for introducing a liquid hydrocarbon into said generating chambers to form oil gas and lamp-black; means for filtering the lamp-black from the oil gas by causing said oil gas with the lamp-black entrained therein to pass downwardly through one of said fuel beds; and means for subsequently utilizing the accumulated lamp-black to reheat said generating chambers.

In testimony whereof I have hereunto set my hand this 14th day of March, A. D. 1927.

LEON B. JONES.